F. T. PAGE.
STRAINING APPLIANCE.
APPLICATION FILED JUNE 1, 1911.
1,024,523.
Patented Apr. 30, 1912.
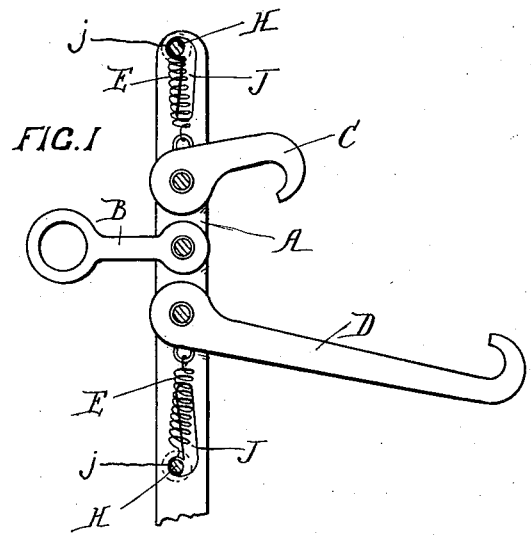
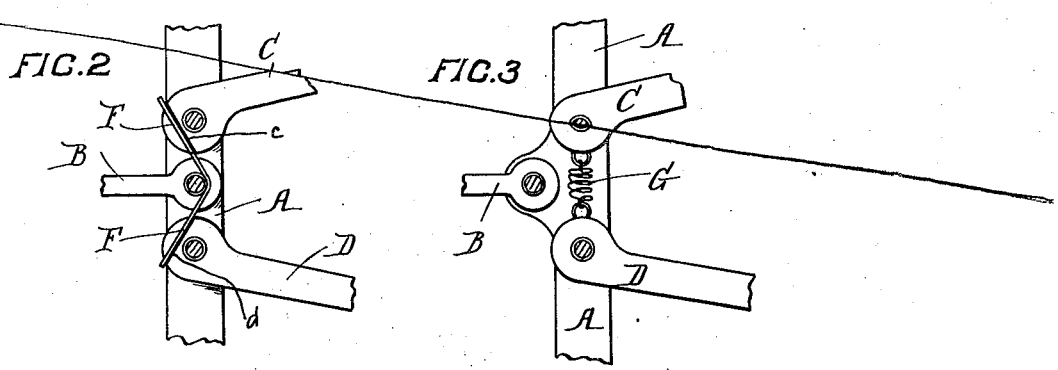
WITNESSES:
John H. Hoving.
INVENTOR:
FRANCIS TEMPLE PAGE
By
Attorney
COLUMBIA PLANOGRAPH CO., WASHINGTON, D. C.

UNITED STATES PATENT OFFICE.

FRANCIS TEMPLE PAGE, OF OTAKI, NEW ZEALAND.

STRAINING APPLIANCE.

1,024,523.  Specification of Letters Patent.  Patented Apr. 30, 1912.

Application filed June 1, 1911. Serial No. 630,720.

*To all whom it may concern:*

Be it known that I, FRANCIS TEMPLE PAGE, a subject of the King of Great Britain, residing at Otaki, in the Dominion of New Zealand, have invented a new and useful Improvement in Straining Appliances; and I do hereby declare the following to be a full, clear, and exact description of the same.

This invention relates to that class of strainer consisting of a lever handle having a pair of hooks pivoted to it and extending from one side thereof, and a single hook or staple extending from the other side thereof and pivoted to the lever handle at a point midway between the points of connections of the hooks extending from the reverse side. This appliance is worked in conjunction with a chain adapted to be gripped upon one of the members to be strained. The other member is attached to the single hook and the double hooks are then caused to alternately engage with the links of the chain and to draw the chain and the member attached to it, in toward the other member by reciprocating the handle lever upon the single hook as a pivot. This strainer is particularly adaptable for use in straining fencing wires, but it may be used for other analogous purposes in which two members are to be drawn together. Hitherto these hooks for engagement with the straining chain have been loosely pivoted to the handle lever so that when using the strainer, each hook has to be placed by hand into engagement with the links of the chain, as it is moved back to take the pull on the chain. This leaves the operator only one hand with which to work the lever so that the amount of strain placed thereon and the consequent strain on the wire is limited thereby.

The present improvements have been designed to provide for the hooks automatically engaging with the links of the chain as the handle is worked so that both hands of the operator may be employed in working the handle. This purpose is effected by means of a spring or springs combined with each hook and so positioned as to keep such hook normally at a constant angle in relation to the handle. As the handle is turned on its pivot and the hooks are caused to change their angles relatively to the straining chain, the springs controlling the hooks will cause them to spring into and out of the chain links as they are moved down to take the strain and are released from the strain.

In the accompanying drawings:—Figure 1 is a plan of the working end of the strainer showing the improvements in position therein. Figs. 2 and 3 show alternative methods of carrying out the invention.

A is the lever handle.

B is the single hook or staple extending from one side and adapted to be connected to one of the wires to be strained, or preferably to a post wire, and serving as the pivot upon which the lever handle A may be rocked.

C, D are the hooks pivoted to the handle lever on the opposite side and at points equally distant from the point of attachment of the hook or staple B, and which hooks are adapted to engage with the links of the straining chain, alternately with each other as the lever is rocked on its pivot and to draw in the chain in the manner well known. In this invention each of these hooks C and D is retained in the same normal position relatively to the handle lever by means of a spring E attached at one end to its boss and at the other end to the handle. This position is preferably such as will provide for the two hooks extending out from the handle at a slight outward inclination from each other.

The manner of fastening the springs E to the handle is preferably such as will allow for the tension of the springs being released whenever required so as thereby to permit of the hooks being turned to lie in an approximately parallel line with the handle and economize space in the packing of the tool for transport. It will also provide against any weakening of the springs' tension that is liable to occur when the tool is stored with the springs in the strained condition. This is effected by attaching one end of the spring to a rivet H mounted to slide in a slot J formed longitudinally in the handle A. The outer end of the slot is formed with a notch *j* into which the rivet will fit when the spring is fully strained, thus retaining the spring at the required tension.

In Fig. 2 a flat bowed spring F is employed and arranged to extend around the pivot attachment of the hook B while its two ends bear against flattened surfaces on the bosses *c* and *d* of the respective hooks C and D. In Fig. 3 a single helical spring G is arranged to extend between the bosses of the two hooks C and D and so arranged as to keep such hooks at the required angle. Other forms of springs may be employed with equal effectiveness and without departing from the spirit of this invention.

It will be apparent that as the lever handle is turned on its pivot to make either hook turn inward relatively to the chain and to engage with and move down the chain, a tension will be placed on its spring which will keep the hook in close engagement with the chain so that it will spring into the link therein. It will be retained in such link by the strain placed on it as the movement of the handle is reversed. At the same time the alteration of its angle relatively to the handle caused by such movement of the lever, will again place a tension on the spring which will cause the hook to fly out of engagement with the chain when its strain is released at the commencement of the fresh outward movement.

What I do claim as my invention, and desire to secure by Letters Patent is:—

1. In a straining appliance, the combination of a lever handle, straining hooks pivoted to said lever handles, and means yieldably holding said hooks in a certain normal position relative to the lever handle and permitting each of the hooks to be yieldably moved in either direction of its pivotal movement from said normal position.

2. In a straining appliance, the combination of a lever handle, a pair of inwardly turned straining hooks pivoted to the lever handle and having the same plane of movement and springs yieldably holding each hook laterally projecting from the lever handle in a certain normal position relative to the lever handle and permitting yieldably movement of the hook away from said normal position in either direction of its pivotal movement.

3. In a straining appliance, the combination of a lever handle, a pair of inwardly turned hooks pivoted to the handle and projecting therefrom on the same side and in the same plane of movement, a straining piece pivoted on the lever handle between the inner ends of said hooks and projecting on the opposite side of the lever handle, and springs engaging said hooks and of themselves adapted to yieldably hold the same projecting from the lever handles in certain normal positions nearly at right angles to the lever handle and permitting yieldable movement on either side of said normal position.

In testimony whereof, I have signed this specification in the presence of two subscribing witnesses.

FRANCIS TEMPLE PAGE.

Witnesses:
J. G. STEVENS,
R. M. FIELDING.

---

Copies of this patent may be obtained for five cents each, by addressing the "Commissioner of Patents, Washington, D. C."